United States Patent [19]

Kaczeus, Sr. et al.

[11] Patent Number: 5,483,419
[45] Date of Patent: Jan. 9, 1996

[54] HOT-SWAPPABLE MULTI-CARTRIDGE DOCKING MODULE

[75] Inventors: Steven L. Kaczeus, Sr., San Jose; Thomas McKnight; Roy J. Edwards, both of Los Gatos, all of Calif.

[73] Assignees: TEAC Corporation, Tokyo, Japan; Pont Peripherals Corporation, Sunnyvale, Calif.

[21] Appl. No.: 152,207

[22] Filed: Nov. 15, 1993

Related U.S. Application Data

[63] Continuation-in-part of Ser. No. 764,590, Sep. 24, 1991, abandoned.

[51] Int. Cl.$^6$ ............... G06F 1/16; H05K 7/10; H01R 13/62
[52] U.S. Cl. ............. 361/685; 361/754; 361/798; 361/727; 439/155; 312/274
[58] Field of Search .............. 364/708.1; 360/137; 439/152, 153, 155, 157, 159, 160, 928; 312/272.5, 274, 275, 9.41; 361/683–685, 724–727, 754, 798

[56] References Cited

U.S. PATENT DOCUMENTS

| | | | |
|---|---|---|---|
| 4,778,401 | 10/1988 | Boudreau et al. | 439/153 |
| 4,933,785 | 6/1990 | Morehouse et al. | |
| 4,954,928 | 9/1990 | Jullien | 439/160 X |
| 4,992,899 | 2/1991 | Kaczeus et al. | |
| 5,025,335 | 6/1991 | Stefansky | |
| 5,025,336 | 6/1992 | Morehouse et al. | |
| 5,027,242 | 6/1991 | Nishida et al. | |
| 5,038,239 | 8/1991 | Vettel et al. | |
| 5,041,924 | 8/1991 | Blackborrow et al. | |
| 5,215,212 | 6/1993 | Stephan | 312/274 X |

FOREIGN PATENT DOCUMENTS

| | | |
|---|---|---|
| 0161720 | 11/1985 | European Pat. Off. |
| 3-150778 | 6/1991 | Japan |
| 2051458 | 1/1981 | United Kingdom |

OTHER PUBLICATIONS

IEEE Transactions on Components, Hybrids, and Manufacturing Technology, vol. 11, No. 4, Dec. 1988, New York, pp. 576–584, XP105724, *Flow Visualization and Special Measurements in a Simulated Rigid Disk Drive*, Abrahamson, Koga & Eaton.

I–Therm 88 (Intersociety Conference on Thermal Phenomena in the Fabricationand Operation of Electronic Components), 11 May 1988, Los Angeles, Ga., pp. 162–170, Xp11602, *Flow and Thermal Fields in Channels Between Corotating Disks*, Torok & Gronseth.

"Multichip Module: Systems Advantages, Major Construction, and Material Technologies", edited by R. Wayne Johnson et al., IEE Press selected Reprint Series, Institute of Electrical and Electronics Engineers, Inc. 1990, pp. 1–4.

Dr. Maurice G. Sage, "Future of Multichip Modules In Electronics", Proc. NEPCOM West '89, pp. 14–20.

John D. Balde, "New Packaging Strategy to Reduce System Costs", IEEE Trans. Components, Hybrids, Manuf. Technol., vol. DHMT–7, No. 3, Sep. 1984, pp. 7–10.

Hardcard. The Inside Story; Plus Development Corp., 1778 McCarthy Boulevard, Milpitas, Calif. 95035-7421, no date.

*Primary Examiner*—Michael W. Phillips

[57] ABSTRACT

A docking module for removable disk drives provides, in one embodiment, space for two such disk drives within a standard half-height bay. The docking module provides cammed insertion and removal together with hot swappability of disk drives. The bay is provided within a housing member. A door is rotatably mounted on the housing member and configured to serve as a lever arm. An engagement portion for urging a disk drive into the bay protrudes from the door. A slide is mounted within the housing member and connected to the door such that rotation of the door causes the slide to move forward and back within the housing member. A tab on the inner end of the slide engages the disk drive to urge the disk drive out of the bay. Alternative embodiments provide ten or more disk drives at a density of two drives per half height bay.

4 Claims, 12 Drawing Sheets

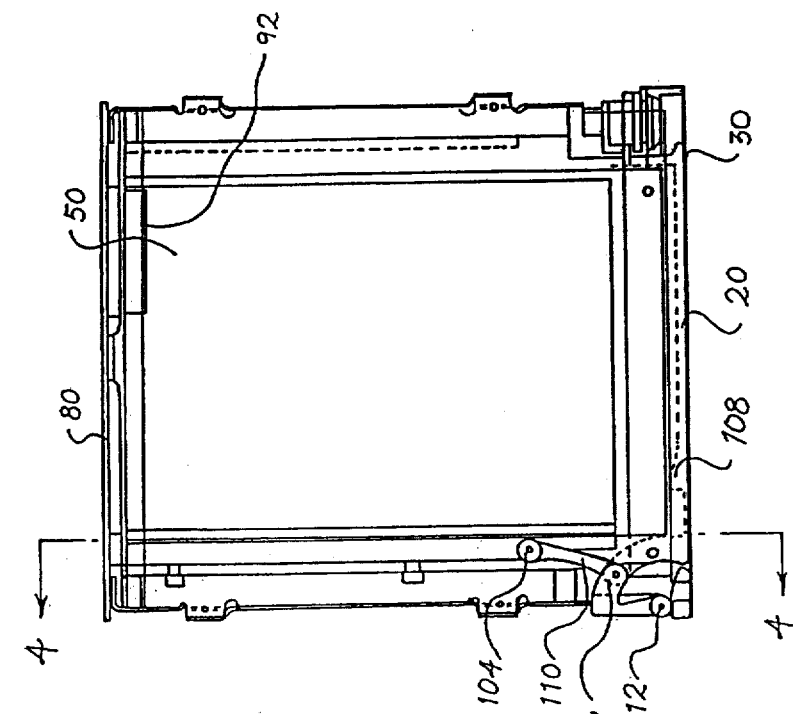
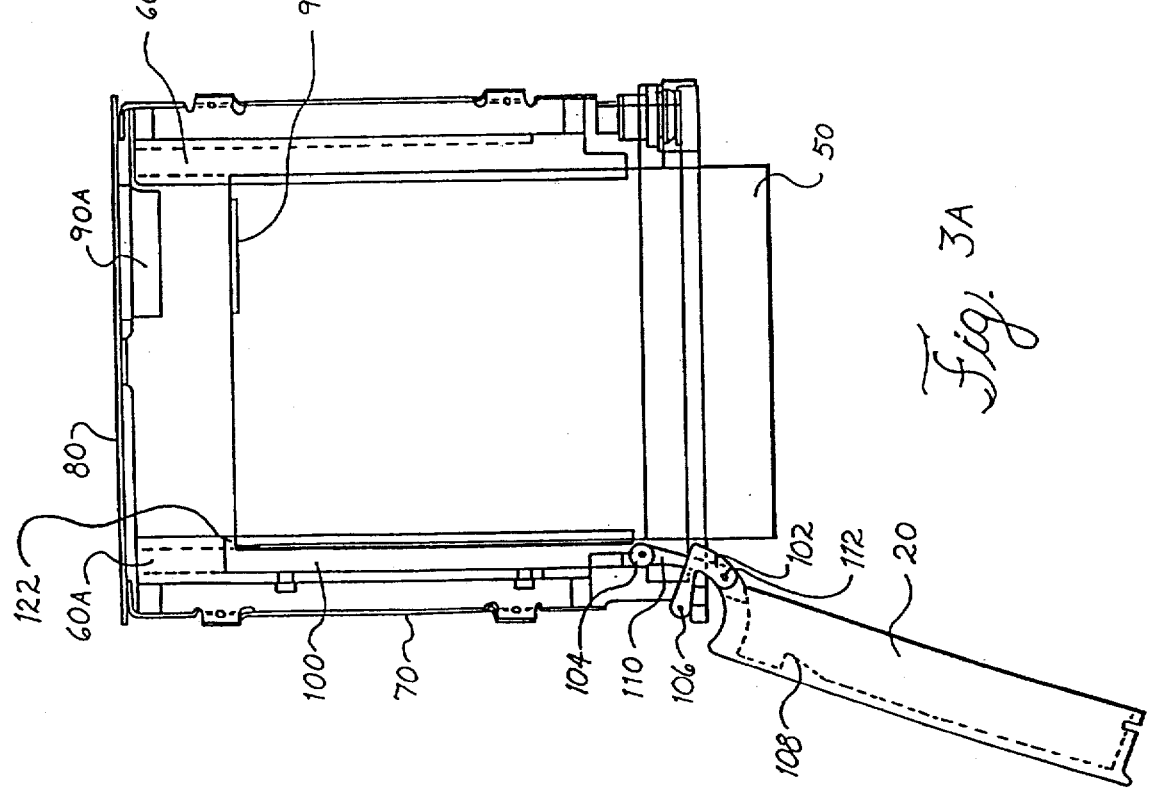

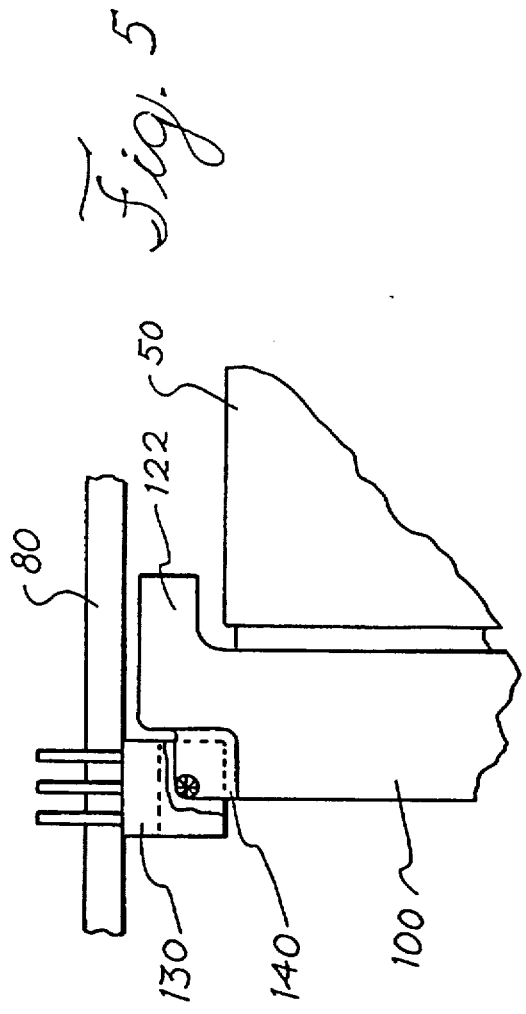
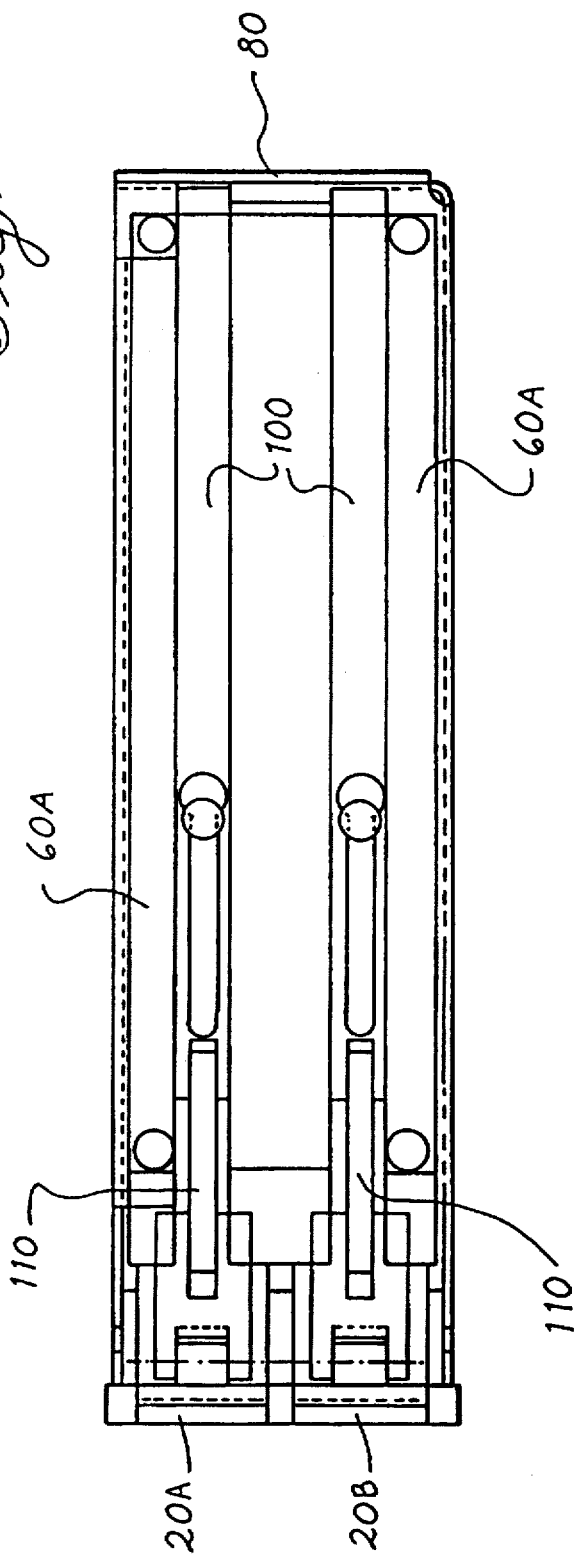

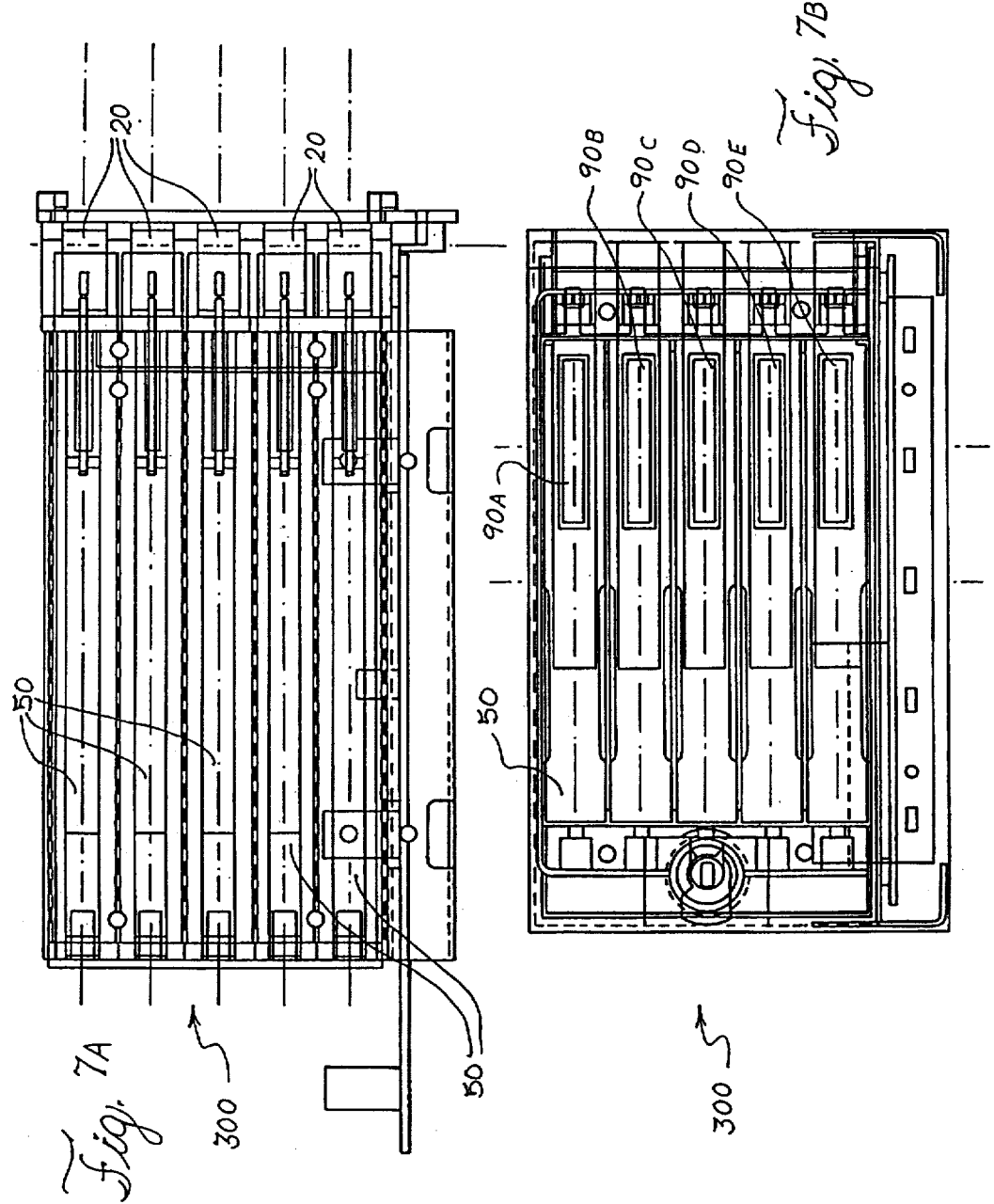

HOT-SWAPPABLE MULTI-CARTRIDGE DOCKING MODULE

Related Application

This application is a continuation-in-part of U.S. patent application Ser. No. 07/764,590, filed Sep. 24, 1991, entitled High Capacity, Low Profile Disk Drive System, which is incorporated herein by reference, now abandoned.

FIELD OF THE INVENTION

This application relates to disk drives generally, and particularly relates to docking modules for removable disk drives.

BACKGROUND OF THE INVENTION

Mass storage requirements for computers have matured substantially since the introduction of the personal computer. In the current computing environment, whether for large systems or personal computers, typical requirements for mass storage devices are in the hundreds of megabytes to several gigabytes. In conjunction with such mass storage requirements are the data security issues which require that these large mass storage devices be backed up in one way or another to ensure that there is minimal loss of data even in the event of a system failure.

There are several ways to achieve these goals. A conventional approach for the mass storage device is one or more fixed disk drives permanently mounted within a chassis. A typical approach for data backup is a tape drive providing archival storage. In some high end systems, such as file servers, it is known to provide mirrored drives, in which a two functionally identical drives are installed with one drive serving as the backup to the other drive. In many such systems, a tape backup is also provided to provide archival storage.

There are a number of difficulties with these approaches to mass storage and backup devices. One difficulty with permanently installed drives is that, in the event of a failure, the entire system must be taken down to replace the drive; even if the system includes mirrored drives, it is generally not recommended to disconnect a permanently installed drive while the system is powered up. Part of the problem relates to the fact that the drives are installed within the cabinet, and are not readily accessible without substantial disassembly of the system.

A second difficulty involves the availability of multiple drive bays for a system. In a conventional system, the number of drive bays available for mass storage devices can be fairly limited. While oversized cabinets have been built to accommodate the desire for multiple, large drives, the trend toward smaller, more compact systems is at odds with the desire for large storage capacities.

A third difficulty with permanently installed drives is that the capacity is limited to a specific number of megabytes. Even if a large capacity is initially provided, a truism in the industry is that capacity will eventually be reached.

A fourth difficulty relates to problems with conventional archival storage devices. Tape backups generally provide inexpensive but slow data storage, where data retrieval times are measured in minutes rather than milliseconds. While this delay is not necessarily bad in every instance, it is certainly undesirable in many applications. In addition, the accuracy of tape as a media is frequently in question.

Finally, a fifth difficulty relates to portability of the data. Permanently installed drives offer little portability, and a failure of another component in the system using exclusively permanently installed drives renders the entire system useless and the data inaccessible. While tape drives offer some solution to this problem, the effort in reinstalling a significant amount of software from tape onto a machine not the source of that data frequently makes the process so slow and inefficient as to be unworkable.

Removable media drives are known in the industry, and offer some limited success in overcoming a few of the foregoing limitations of conventional prior art systems. For example, SyQuest Technology offers cartridge drives in which the media can be removed from the remainder of the drive. While this approach does offer the ability to expand the capacity of a drive, the media in a SyQuest cartridge is readily exposed to the environment and can easily become contaminated from such exposure, rendering the cartridge useless. In addition, Bernoulli drives offer removable media, but suffer from slow access time and limited reliability. In addition, none of these devices can be readily hot swapped, and each of them has, historically, taken up at least a half-height drive bay for a single device. Importantly, the limited storage capacity of these devices makes them unsatisfactory as a primary drive or, in at least a number of cases, a backup device.

The assignee of the present invention has, in the past, offered a solution to some, but not all, of the foregoing limitations of the prior art. The aforementioned U.S. patent application Ser. No. 07/764,590, filed Sep. 24, 1991, discloses a removable disk drive of sufficient capacity to be installed as either a primary drive, a secondary drive, or a backup device. Moreover, the unit offers relatively fast access times, unlimited expansion of total capacity through the use of multiple cartridges, and shirt pocket portability. However, the device disclosed there did not include means for hot swapping of drives; that is, exchanging drives while the system is still operating without loss of data, and also provides only a single cartridge per half-height bay. In addition, while the docking module provided there operates well for many users, a method for simply ensuring that the drive is fully installed or disconnected is desirable.

As a result, there has been a need for a removable cartridge drive which improves upon the foregoing limitations of the prior art.

Summary of the Invention

The present invention substantially eliminates, or at the very least improves upon, each of the foregoing limitations of the prior art. The present invention is a docking module which cooperates with the disk drive disclosed in U.S. patent application Ser. No. 07/764,590, mentioned above, to provide a disk drive subsystem with hot swappability, multiple drives in a single half-height bay, and a means for positive insertion and removal of the drive.

In particular, the drive docking module of the present invention, in a first embodiment, provides a half-height structure having two drive bays, each capable of receiving a disk drive constructed in accordance with the '590 application noted above. In addition, a tri-state bus arrangement is provided so that either or both of the dual drives can be added to the system or removed from the system without requiring the rest of the system to be shut down.

Further, a positive insertion and removal structure is provided for ensuring that the drives are fully and correctly inserted and for simplifying the removal of a drive from the module. The insertion and removal structure cooperates with the electronics to assist in providing the hot swappability mentioned above, by causing power to the disconnected to the drive before the drive is actually disconnected from the backplane connector of the drive module.

In other embodiments of the present invention, various arrangements are shown in which a number of drives can be inserted into a docking module constructed in accordance with the present invention. In particular, these other arrangements allow for two such drives per half-height bay, but are several such bays high, allowing for as many as ten or more such disk drives within a single docking module. These configurations are particularly suited to RAID applications.

It is therefore one object of the present invention to provide a docking module which provides hot swappability of a disk drive within a computer system.

It is another object of the present invention to provide a docking module having the capacity for multiple thin disk drives within the space of a half-height bay.

It is a further object of the present invention to provide a docking module capable of supporting a plurality of disk drives at a density of at least two drives per half-height bay.

It is a still further object of the present invention to provide a means for positive insertion and removal of a disk drive from a bay within a docking module.

These and other objects of the present invention may be better appreciated by the following Detailed Description of the Invention, taken together with the attached Figures.

FIGURES

FIGS. 3A and 3B show in top plan view the docking module of FIGS. 1 and 2, and in particular shows the relationship between the door and the slide in the open and closed positions, respectively.

FIG. 4 shows in cross-sectional side view the docking module of FIGS. 1–3 taken along line 4—4 of FIG. 3B.

FIG. 5 shows in detail view the relationship between the end of the slide, the disk drive and the optical switch.

FIGS. 7A–7B show an alternative embodiment of a docking module for use with five drives.

DETAILED DESCRIPTION OF THE INVENTION

Figure 1:
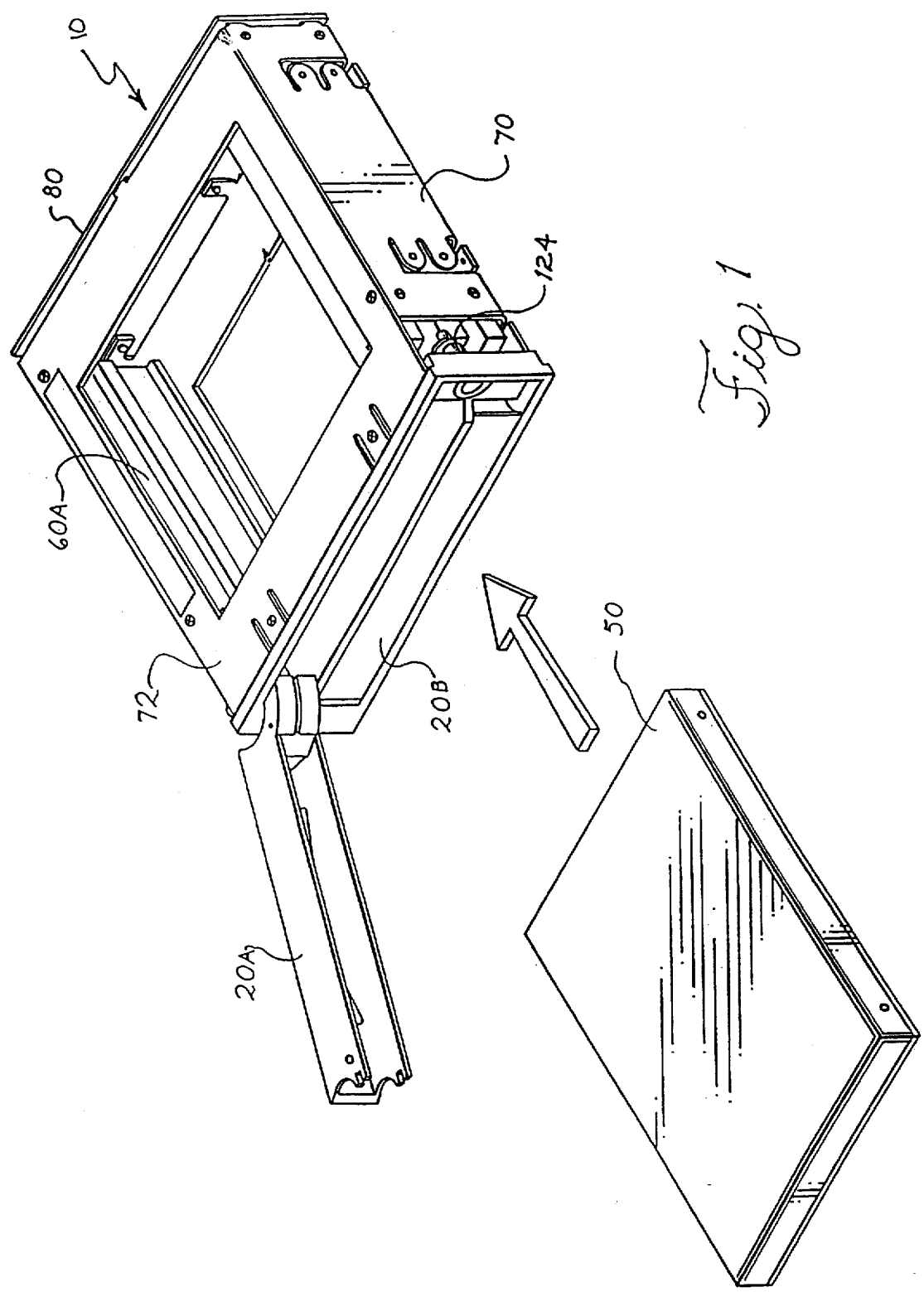
FIG. 1 shows in perspective view a two drive docking module in accordance with the present invention.
Figure 2:
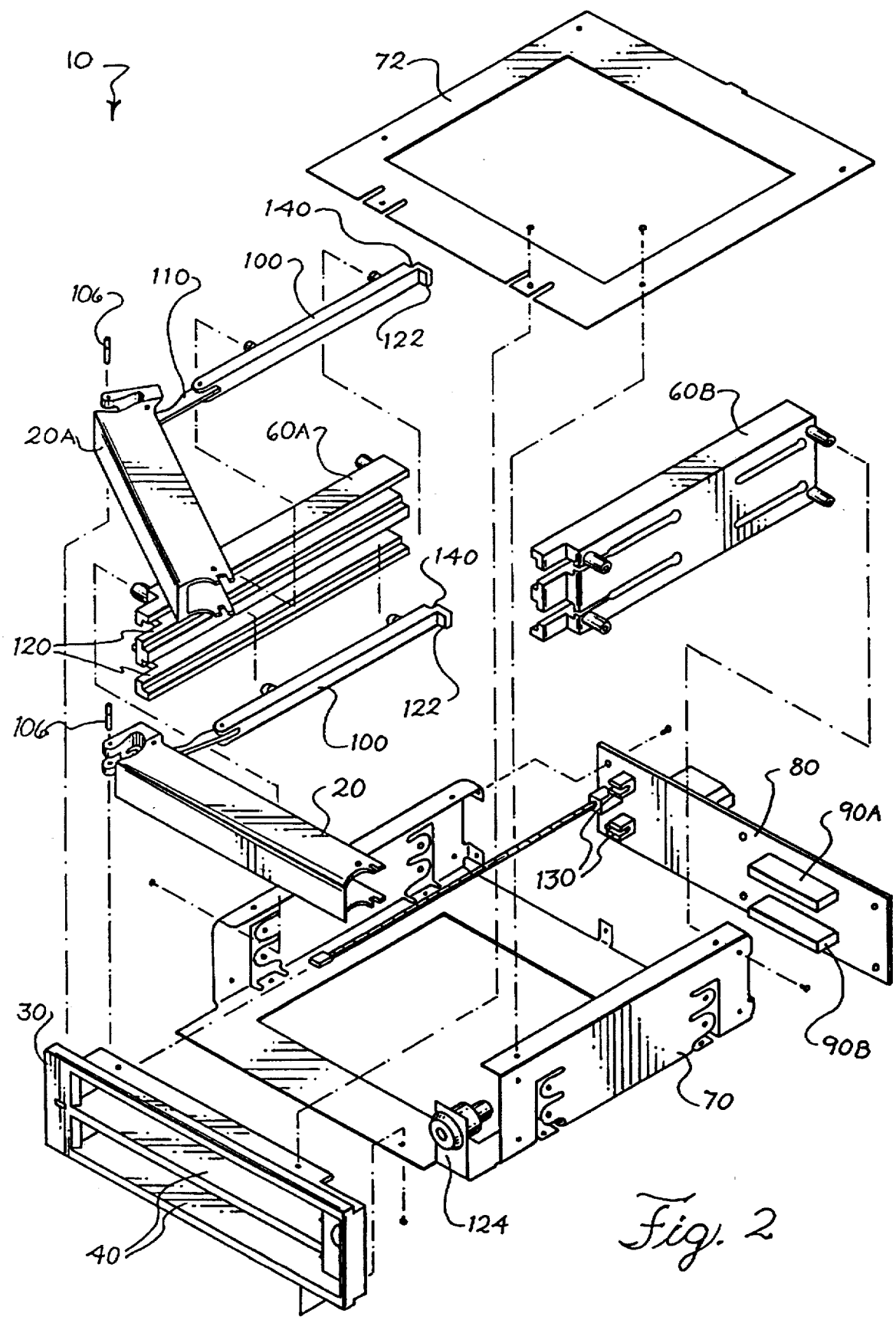
FIG. 2 shows in exploded perspective view the two drive docking module of FIG. 1.
Figure 6A:
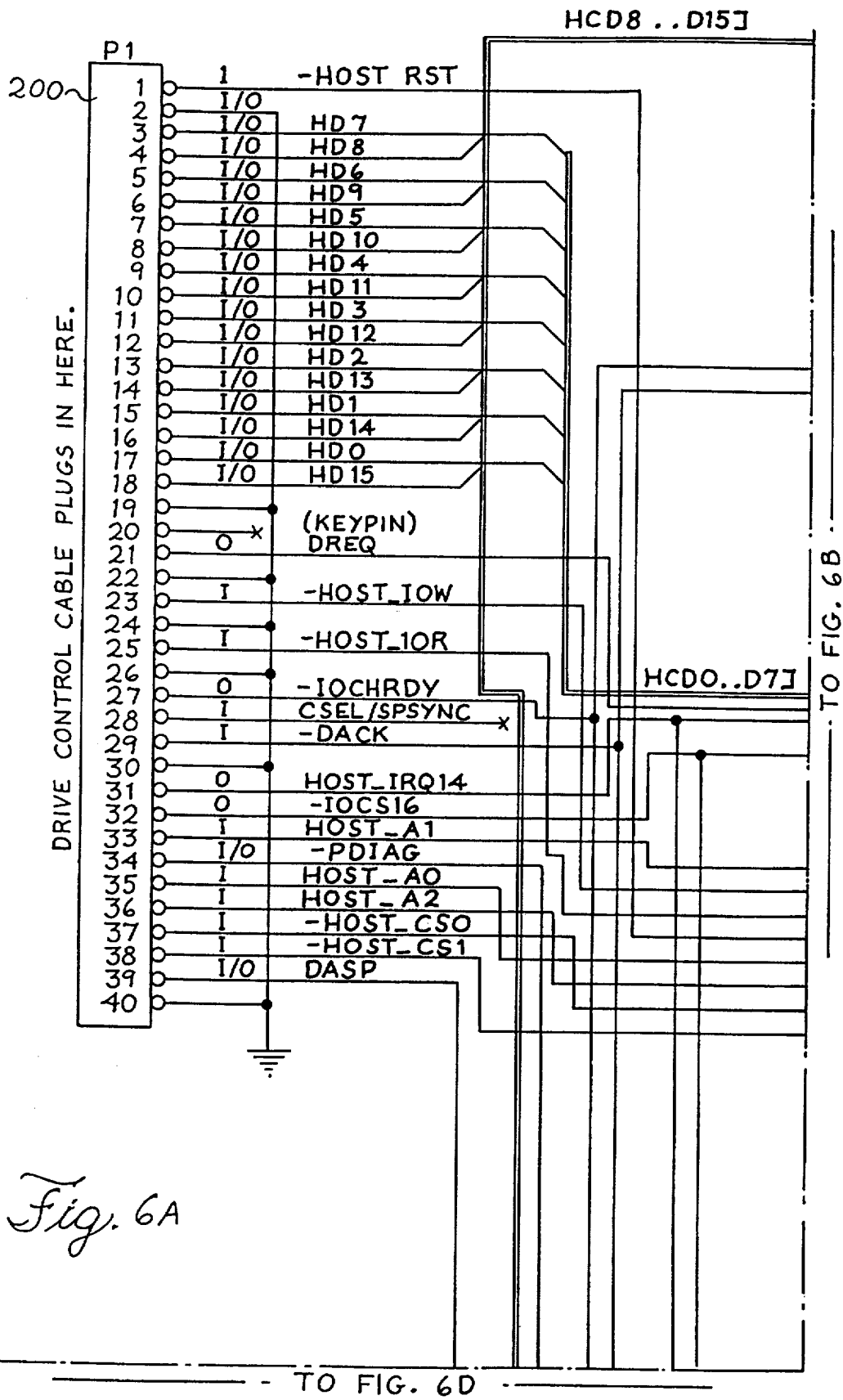
FIGS. 6A–6F shows in schematic block diagram form the circuitry for providing hot swappability of the drive of FIG. 1.
Figure 6B:
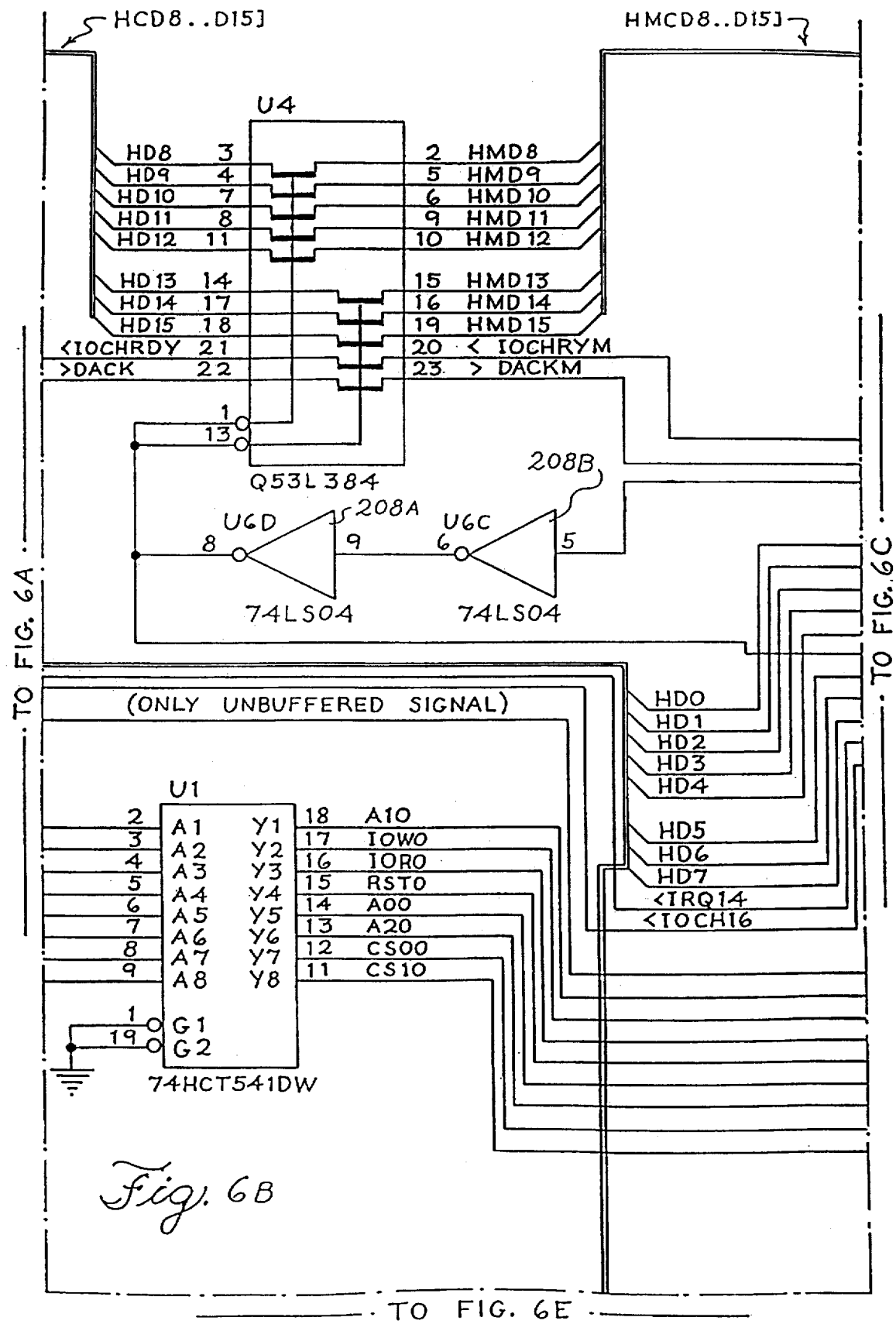
Figure 6C:
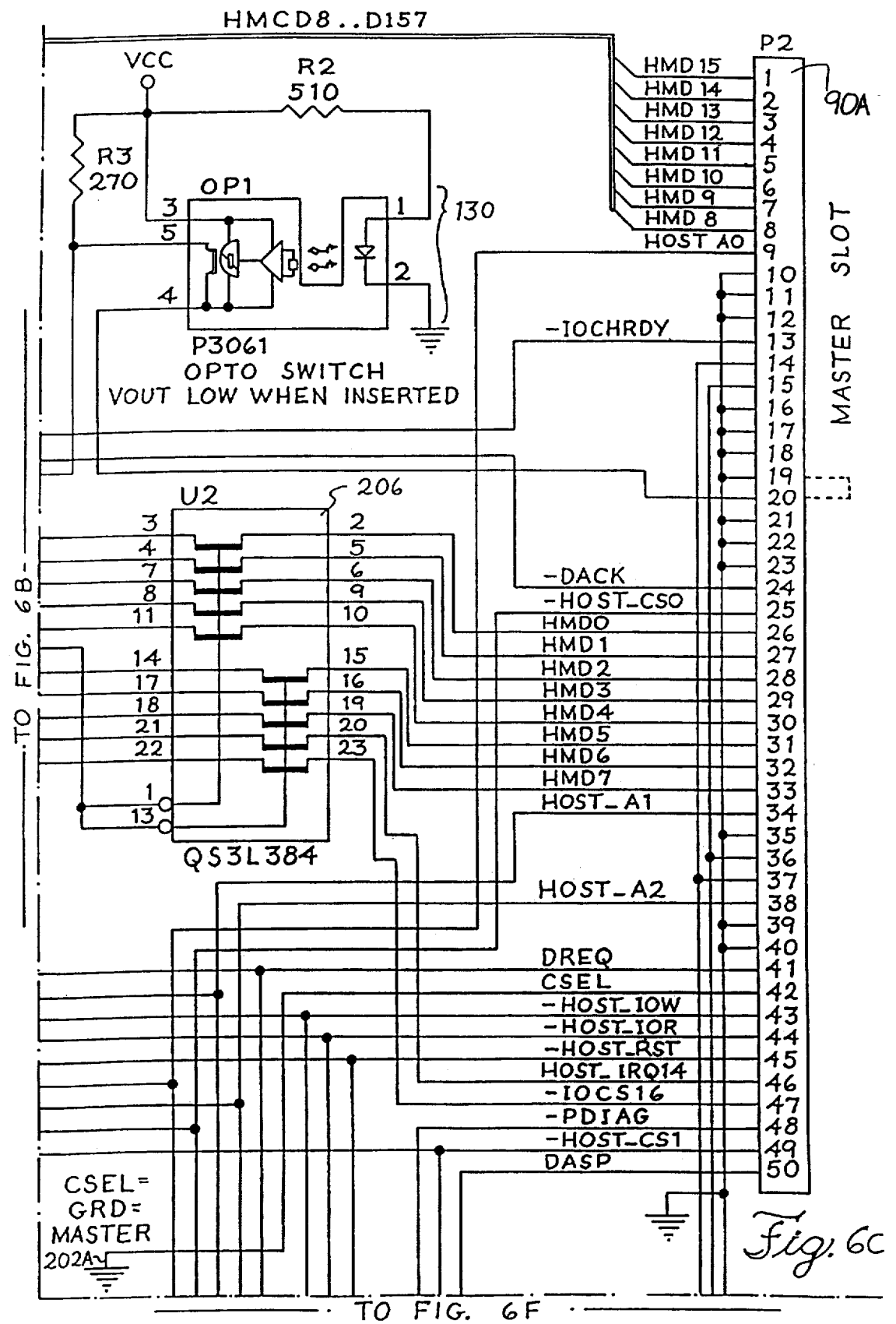
Figure 6D:
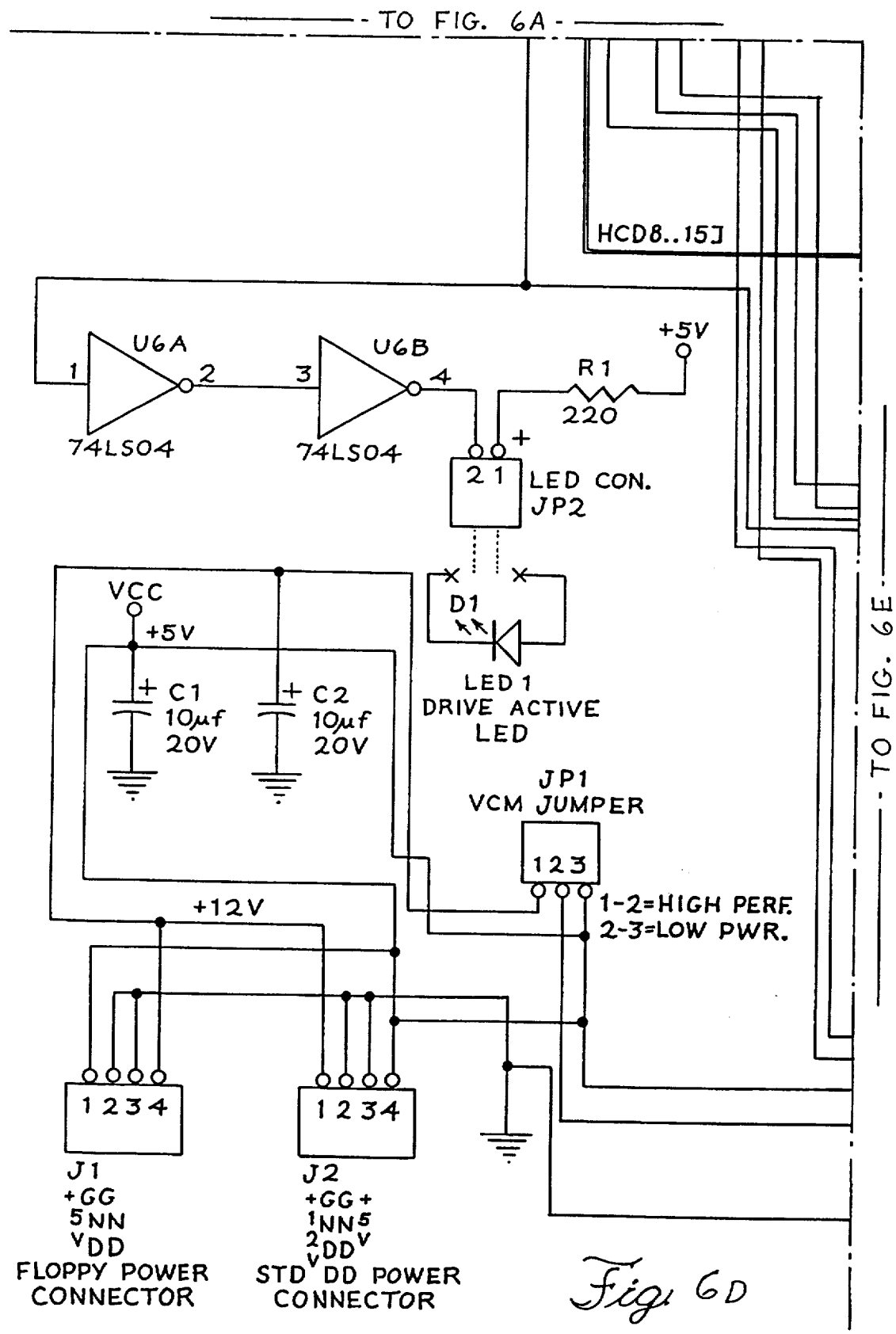
Figure 6E:
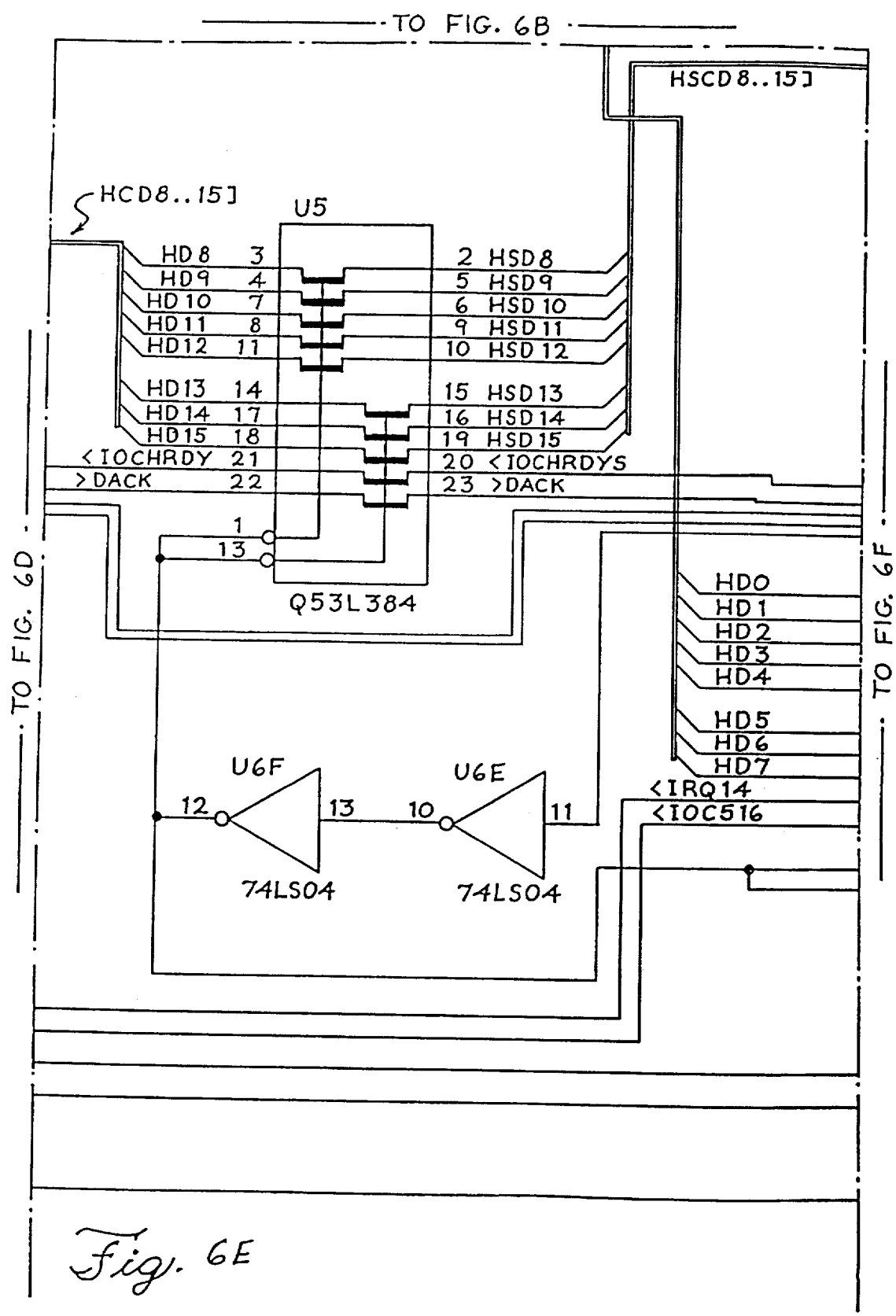
Figure 6F:
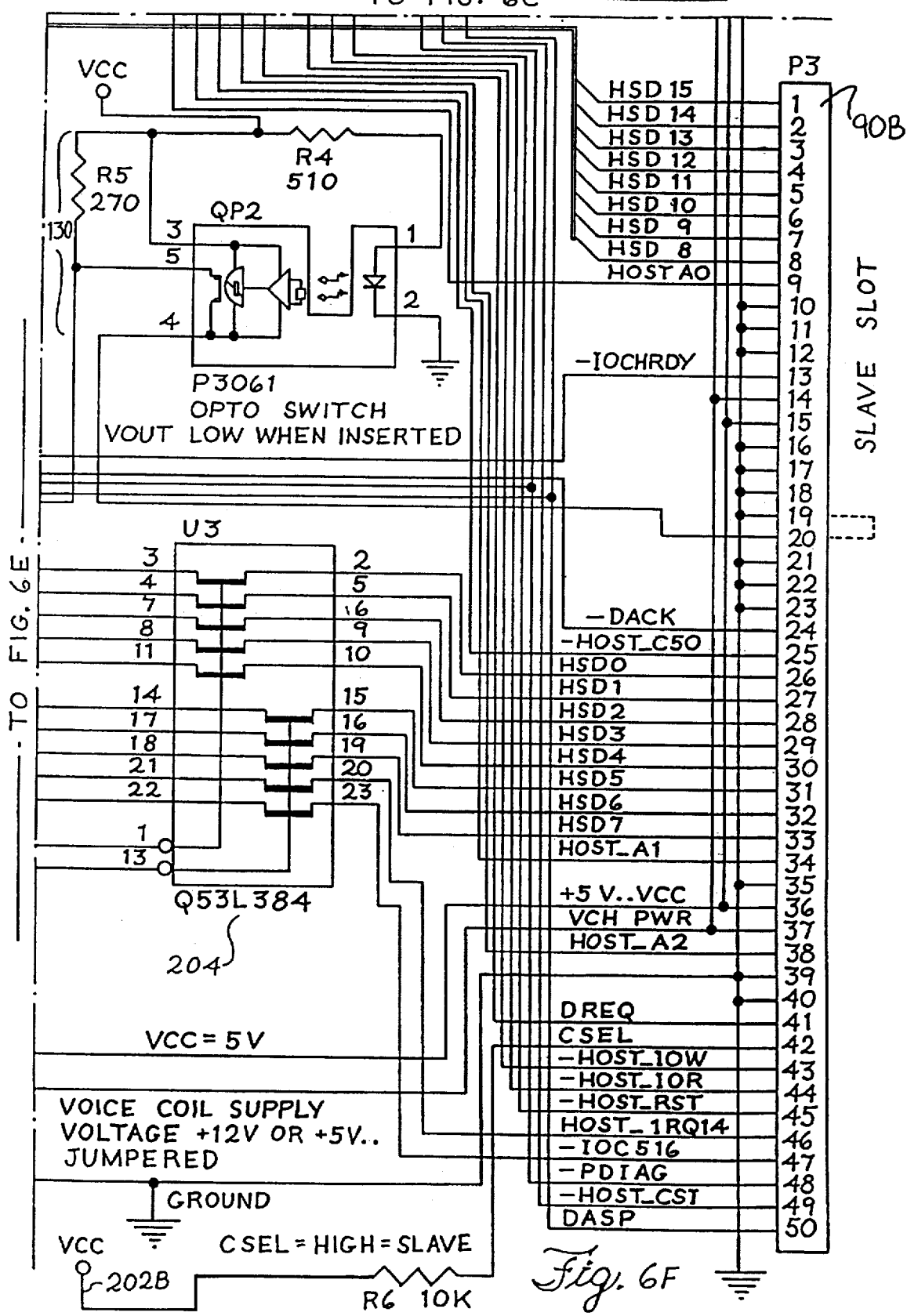

Referring now to FIGS. 1 and 2, a half-height docking module 10, designed to be installed within a housing such as a computer chassis or an external housing (not shown), includes a pair of doors 20A–B in a bezel 30. When either door 20 is opened a slot 40 suitable for receiving a disk drive 50 constructed in accordance with U.S. patent application Ser. No. 07/764,590, filed Sep. 24, 1991 and commonly assigned with the present application, is exposed. The drive 50 is inserted through the door into a pair of guides 60A and 60B, which are supported by a housing 70 enclosed at the top by a cover 72. The housing 70 supports, at the back thereof, a printed circuit board 80. The guides 60A–B extend from the door 20 to the printed circuit board 80, on which are connectors 90A–B designed to mate with a connector 92 on the abutting part of the drive 50 to provide power to the drive and communications between the PCB 80, a conventional host system (not shown) and the drive 50.

Each of the doors 20A–B connects to an associated slide 100 by means of a link 110, held in place by pins 112. The slide 100 in turn moves within a slot 120 in the left guide 60A. A tab 122, positioned slightly near but not quite at the end of the slide 100, extends out from the slide sufficiently to engage the drive 50 when the associated door 20 is opened, as will be appreciated in greater detail hereinafter. A lock 124 may be provided to engage a tab on the doors 20 to prevent unauthorized removal of the drives 50.

As best seen from FIG. 2, the printed circuit board 80 may be better appreciated. In addition to the connectors 90A–B, an optical switch 130 comprised of an LED/photosensor pair may be seen near the end each of the slides 100. When the door 20 is fully closed and a drive 50 is fully installed within the docking module 10, the back end 140 of the slide 100 will extend between the LED and its associate photosensor. As will be appreciated hereinafter in connection with FIGS. 5 and 6, the optical switch 130 is actuated by a slight forward movement of the slide 100 caused by the initial opening of the door, and before the tab 122 engages the drive 50 sufficiently to cause the connector on the back of the drive 50 to be disconnected from the connector 90 on the PCB 80. In this manner the drive 50 may be electrically disconnected from the host system bus prior to any physical disconnection.

Similarly, it will be appreciated that, when the drive 50 is inserted through the slot 40 and into the guides 60A–B, pushing on the door 20 gently forces the drive 50 into the connector 90 on the PCB 80. Momentarily after that connection is made, continued movement of the door 20 causes the end of the slide 100 to be inserted between the LED and photosensor of the optical switch 130. This, in turn, allows the host system to recognize the installation of the drive 50. It will be appreciated that, when the drive is fully installed in the preferred embodiment, the door closes and no components protrude beyond the doors.

Referring next to FIGS. 3A–B and 4, which show, respectively, the top plan view of the docking module 10 and a cross-sectional side view thereof taken along lines 4—4 in FIG. 3B, the arrangement of the drive 50 within the docking module 10 may be better appreciated. In particular, the upper door 20A is shown partially open with the associated slide 100 moved forward so that the tab 120 engages the associated drive 50 and causes it to be disconnected from the PCB 80 at connector 90. In contrast, lower door 20B is shown fully closed with its associated drive 50 fully installed and a connector 92 on the drive 50 mated with the connector 90, and its associated slide 100 fully extended into the opening in optical switch 130.

With particular reference to FIGS. 3A–B, the camming operation of the door 20 with the slide 100 may be better appreciated. The end of the door 20 to which the slide is connected may be seen to include a cam surface 102, where the pin 112 connects to one end of the link 110. A second pin 104 may be seen to connect the other end of the link 110 to the slide 100. A third pin 106 connects the end of the cam surface 102 to the bezel 30, so that rotation of the door 20 about the pin 106 causes the slide to be pushed back or pulled forward. A protrusion 108 on the back surface of door 20 provides pressure against the drive 50 to urge the drive into the connector 92.

By appropriate configuration of the cam surface 102, the protrusion 108 and the door 20, a significant mechanical advantage can be provided for urging the connector 92 on the disk drive 50 into a mating position with the connector 90 on the PCB 80. Likewise, the tab 122 on the end of the slide 100 cooperates with the door 20 and the cam surface 102 to provide a mechanical advantage in ejecting the drive from the connector 90.

In a presently preferred embodiment a mechanical advantage of approximately 10:1 is provided. This allows use of a connectors 90 and 92 with a relatively high retentive force while at the same time providing the user with relatively easy insertion and removal.

With reference next to FIG. 5, the cooperation of the slide 100 with the optical switch 130 and drive 50 may be better appreciated. In FIG. 5, slide 100 is shown with tab 122 juxtaposed against the back edge of drive 50 with connector 92 inserted into connector 90A, while slide end 140 has not yet engaged optical switch 130. The importance of this feature will be better appreciated in connection with FIG. 6, but it is important at this point to recognize that, on insertion of the drive, electrical contact is made at connector 90A, which supplies power and data signals to the drive 50, prior to actuation of optical switch 130. Similarly, on drive removal, optical switch 130 or its functional equivalent is disengaged before the drive is actually removed from the connector 90A.

Referring next to FIGS. 6A–6F, the operation of the PCB 80 may be better understood, including the capability in the present invention for adding and removing drives while the host system is operating, or what has been referred to herein as "hot swappability." This feature is particularly helpful in implementing RAID drive arrays. More particularly, FIG. 6A–6F shows in schematic block diagram form the circuitry implemented on PCB 80. While the circuitry shown in FIGS. 6A–6F is directed to disk drives using the AT or IDE interface, it will be appreciated by those skilled in the art that, given the teachings herein, other interfaces could readily be used. As will be appreciated in greater detail hereinafter, the basic function of the circuitry of FIG. 6A–6F is to isolate the IDE interface by means of a series of FET switch arrays when a drive is not fully installed in a slot with the door closed, although other means can be used to accomplish the necessary objectives, as will be discussed hereinafter.

The circuitry of FIGS. 6A–6F includes a bus connector 200 for connection to the IDE bus of the host system (not shown) in a conventional manner. In contrast, each of two disk drives connects to either connector 90A or 90B. For purposes of this discussion, connector 90A will be defined as the master connector, while connector 90B will be defined as the slave connector, as required by the CSEL signal 202A being tied low for the master and CSEL signal 202B tied high for the slave connector. In the typical embodiment the drive 50 inserted in each slot will sense the associated voltage and assume the appropriate role. Alternatively, the master/slave relationship can be defined in the drive itself, so that a drive is defined as a master or slave regardless of the slot into which it is inserted.

As discussed in connection with FIGS. 1 and 2, each slot has associated with it an optical switch 130. For purposes of simplicity, insertion of a drive 50 into the master slot will be explained; insertion of a drive into the slave slot involves identical components and operates in the same way.

The installation of a drive 50 involves cooperation between the mechanical components of the docking module and the circuitry of FIGS. 6A–6F. As a drive 50 is inserted by closing the door 20, the connector 92 on the back of the drive 50 makes connection with the associated connector 90A. This causes power to be applied, and the drive starts to spin up. As the door continues to close, the optical switch 130 opens and enables associated FET switch arrays 204 and 206 through a pair of buffers 208A–B. In the event the door is closed but no drive is installed, the optical switch 130 will not open because the ground path for the switch 130 is through the drive 50, When FET switch arrays 204 and 206 close, the signals HD0 through HD15 are connected from the bus connector 200 to the drive connector 90A and thence to the drive 50. The FET switch arrays shown comprise eight switches each, and so eight HD signals are switched by each array, necessitating two switch arrays for a sixteen bit bus. However, it will apparent that different sizes of arrays may be used, and different bus widths may be accommodated as appropriate for the host system.

The data returning from the drive 50 to the host bus is buffered by means of a permanently enabled register, for example a 74HCT541DW. In this manner the outputs of the drive cannot corrupt the data on the host system bus. While such protection from data corruption may not be required in all instances, in some embodiments of the invention it is difficult to predict the initial state of many of the signals, and thus such protection is a good design practice. It will be appreciated, given the foregoing teachings, that the fundamental steps in installing a drive are first, the application of power; second, connection of the drive signals to the host bus; and third, the installation of the drive is sensed, to cause the tri-state buffers to connect the drive to the bus.

Once the drive is installed into the system, the system recognizes the drive in the conventional manner, with the exception that the device driver always assigns a drive letter to a slot, whether or not a disk is present. The device driver further provides a software interrupt looking for a drive to be installed in an empty slot. Once a drive is detected by the system, the software interrupt causes the device driver to do a Drive Inquiry command. The drive 50 responds with its configuration of heads, cylinders and sectors, which allows the IDE interface from the host to address it. The system then can automatically address the drive and its data without rebooting.

During operation, the drive 50 operates as a conventional drive. When the user desires to remove the drive, the door 20A is opened, causing the end 140 of the slide 120 to move out of the optical switch 130. This opens the FET switch arrays 204 and 206, disconnecting the drive 50 from the host system bus. The drive is then physically disconnected from the connector 90A, causing the drive to power down in a conventional manner.

Removal of the drive is essentially the reverse of installation. Opening the door causes the optical switch to open, which opens the FET switch arrays 204 and 206. The tab 122 then begins to pull the drive 50 out of the connector, and eventually disconnects power to the drive. At this point the bus is fully tristated, so that no data corruption occurs. Those skilled in the art will recognize that it is not necessary in all instances to provide tri-state buffers for the bus at the connector 200, although such a design is preferred in the exemplary embodiment described herein. In some instances it may be desirable to eliminate the FET switches and control the bus signals either directly from the drive or in another suitable manner.

Additionally, in some embodiments it may be preferable to provide a power-up delay between the time power is applied to the drive and the time the bus is enabled, to allow the drive to spin up and reach a stable state before the bus is enabled. In still other embodiments, it may be desirable to eliminate the optical switch 130. This can be accomplished in numerous ways, one of which is to use multi-sense pins on the connector 92. By using pins of three different lengths, with the power supply pins being longest, the bus pins being shorter, and the drive output pins the shortest, the power supply connection is made first, with the remaining connections being made at appropriate subsequent times.

Another alternative may include providing a data register into which data from a device driver may be written to the host system to allow additional control of docking module features. The register would typically be addressable at a free I/O location under the IDE (or alternative interface) address space, and could be configured to lock and unlock a solenoid to prevent or enable removal of the cartridge; provide LED status to indicate drive availability; enable or disable a Write Protect or Read Protect Bit, for security purposes; or enable a solenoid or other device for automated ejection of a drive 50. Other aspects which may be controlled by appropriate device drivers including Flush Write Cache, Spin Down, Tri-State Bus, and so on.

Referring next to FIGS. 7A–7B, an alternative embodiment to the design of FIGS. 1 and 2 may be better understood. FIG. 7A is a side elevational view of a docking module 300 capable of holding five drives 50; FIG. 7B is a front view of the same module; each has certain internal components shown for clarity.

Figure 8:
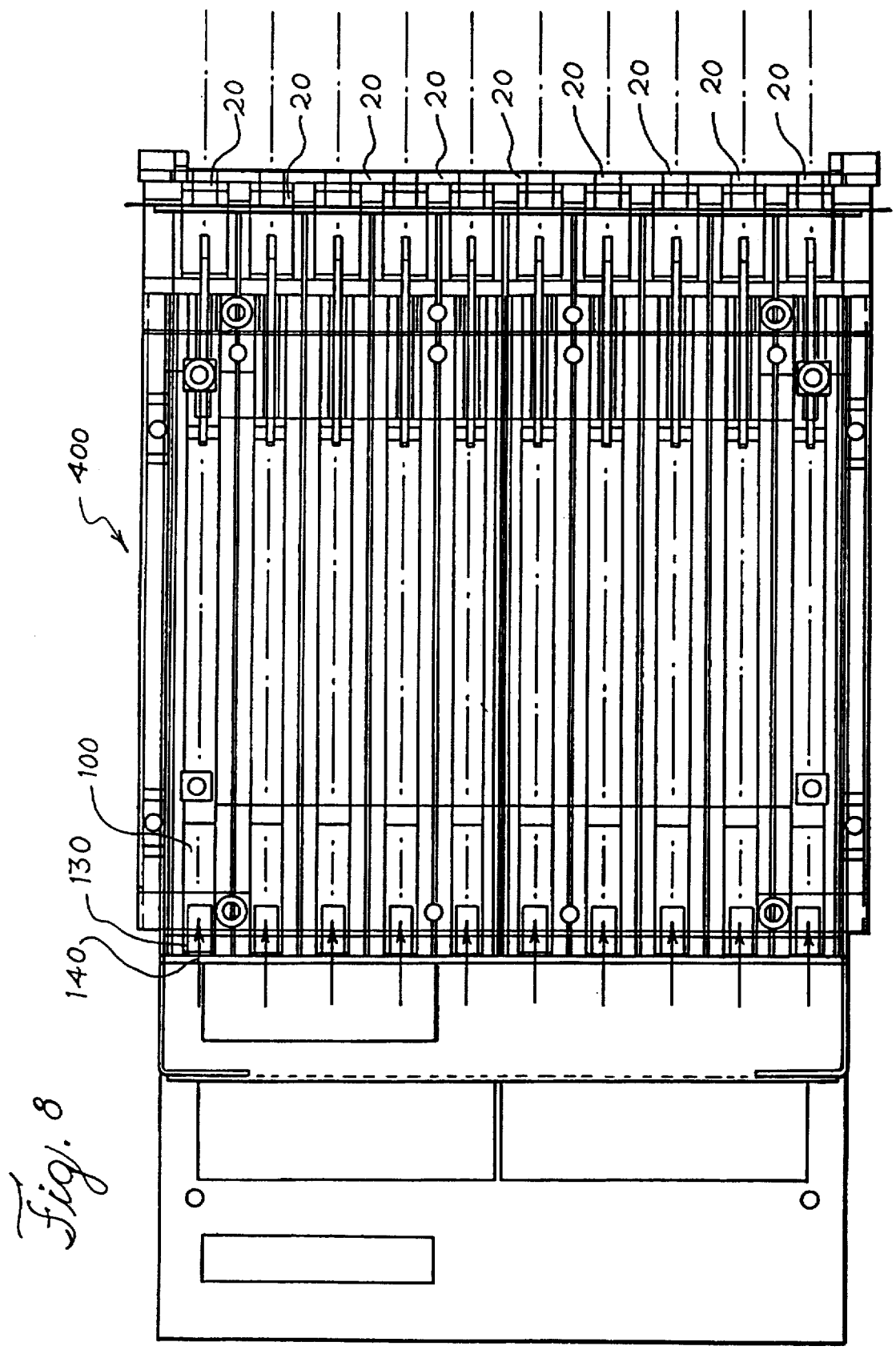
FIG. 8 shows an alternative embodiment of a docking module for use with ten drives.

Referring next to FIG. 8, a docking module 400 capable of holding ten removable disk drives 50 at a density of two drives per half-height bay is shown in side elevational view with certain elements revealed through the chassis.

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

What is claimed is:

1. A docking module for use with removable disk drives, the disk drives each including an electrical connector, the docking module comprising:

a housing member having a plurality of slots therein, each slot configured to receive a removable disk drive;

a docking module connector mateable with the connector on the removable hard disk drive to electrically connect the removable disk drive to a host;

a door rotatably mounted on the housing and configured to serve as a lever arm, the door having an engagement surface projecting therefrom to urge the connector on the disk drive into connection with the docking module connector when the door is closed; and a slide mounted within the housing and connected to the door so that rotation of the door causes at least a portion of the slide to move forward and back within the housing, the slide adapted to engage the disk drive and urge the disk drive out of the docking module and disconnect the docking module connector from the disk drive connector when the door is opened.

2. The docking module according to claim 1 wherein the housing has two slots.

3. The docking module according to claim 1 wherein each slot is capable of receiving internally therein a disk drive having a nominal width of 4 inches, a nominal depth of 5.75 inches and a nominal height of one-half inch.

4. A docking module for use with at least two removable disk drives, the disk drives each including an electrical connector, the docking module comprising:

a housing member having a plurality of slots therein, each slot configured to receive a removable disk drive;

a docking module connector mateable with the connector on the removable disk drive to electrically connect the removable disk drive to a host;

a door rotatably mounted on the housing and configured to serve as a lever arm;

a slide mounted within the housing and connected to the door so that rotation of the door causes at least a portion of the slide to move forward and back within the housing;

engagement means projecting from the door for urging the connector on the disk drive into connection with the connector on the docking module when the door is closed; and disengagement means attached to the slide for urging the disk drive out of the docking module to thereby disconnect the docking module connector from the disk drive connector when the door is opened.

\* \* \* \* \*

UNITED STATES PATENT AND TRADEMARK OFFICE
CERTIFICATE OF CORRECTION

PATENT NO. : 5,483,419
DATED : January 9, 1996
INVENTOR(S) : Steven L. Kaczeus et al.          Page 1 of 2

It is certified that error appears in the above-indentified patent and that said Letters Patent is hereby corrected as shown below:

On the title page, item [54] and column 1, line 2:

In the Title, after "MODULE" add --WITH SLIDE CONNECTED TO A DOOR--.

In Column 1, line 6 under "References Cited U.S. PATENT DOCUMENTS" delete "6/1992" and substitute --6/1991--.

In Column 1, line 9 under "References Cited U.S. PATENT DOCUMENTS" delete "5,041,924" and substitute --5,014,924--.

In Column 1, line 1 under "References Cited FOREIGN PATENT DOCUMENTS" delete "0161720" and substitute --EP-A-0161720--.

In Column 1, line 2 under "References Cited FOREIGN PATENT DOCUMENTS" delete "3-150778" and substitute --JP-A-03-150778--.

In Column 1, line 3 under "References Cited FOREIGN PATENT DOCUMENTS" delete "2051458" and substitute --GB-A-2051458--.

Under the heading "OTHER PUBLICATIONS", line 7, delete "Fabricationand" and substitute --Fabrication and--.

Under the heading "OTHER PUBLICATIONS", line 8, delete "Ga" and substitute --CA--.

UNITED STATES PATENT AND TRADEMARK OFFICE
CERTIFICATE OF CORRECTION

PATENT NO. : 5,483,419
DATED : January 9, 1996
INVENTOR(S) : Steven L. Kaczeus et al.

It is certified that error appears in the above-indentified patent and that said Letters Patent is hereby corrected as shown below:

Under the heading "OTHER PUBLICATIONS", line 11, delete "Module:" and substitute --Modules:--.

Under the heading "OTHER PUBLICATIONS", line 11, delete "Construction" and substitute --Constructions--.

Under the heading "OTHER PUBLICATIONS", line 12, delete "Material" and substitute --Materials--.

Under the heading "OTHER PUBLICATIONS", line 13, delete "IEE" and substitute --IEEE--.

Under the heading "OTHER PUBLICATIONS", line 19, delete "DHMT" and substitute --CHMT--.

In Column 2, after line 23, add the following:
--*Attorney, Agent, or Firm*-Brinks Hofer Gilson & Lione--.

Signed and Sealed this

Second Day of September, 1997

Attest:

BRUCE LEHMAN

*Attesting Officer*     Commissioner of Patents and Trademarks